United States Patent [19]
Barmatz et al.

[11] Patent Number: 4,773,266
[45] Date of Patent: Sep. 27, 1988

[54] STABILIZATION AND OSCILLATION OF AN ACOUSTICALLY LEVITATED OBJECT

[75] Inventors: Martin B. Barmatz, Glendale; Steven L. Garrett, Pebble Beach, both of Calif.

[73] Assignee: The United States of America as represented by the Administrator of the National Aeronautics and Space Administration, Washington, D.C.

[21] Appl. No.: 87,283

[22] Filed: Aug. 20, 1987

[51] Int. Cl.[4] ............ G01K 15/00
[52] U.S. Cl. ............ 73/505
[58] Field of Search ............ 73/505

[56] References Cited

U.S. PATENT DOCUMENTS 3,882,732 5/1975 Fletcher et al. ............ 73/505
4,139,806 2/1979 Kanber et al. ............ 318/116
4,425,376 1/1984 Lee ............ 427/57
4,463,606 8/1984 Barmatz ............ 73/505
4,520,656 6/1985 Barmatz et al. ............ 73/505
4,573,356 3/1986 Barmatz et al. ............ 73/505

OTHER PUBLICATIONS

E. H. Trinh, "Compact Acoustic Levitation Device for Studies in Fluid Dynamics and Material Science in the Laboratory and Microgravity," Rev. Sci. Instrum. 56 (11), Nov., 1985, pp. 2059-2065.

*Primary Examiner*—Michael J. Tokar
*Assistant Examiner*—Robert Bell
*Attorney, Agent, or Firm*—Paul F. McCaul; John R. Manning; Thomas H. Jones

[57] ABSTRACT

Methods are described for rapidly damping oscillation of an acoustically levitated object or for causing and maintaining such oscillations, and a method is provided for determining the restoring force constant K on the levitated object by measuring its frequency of oscillation. Oscillations of a levitated object are damped by applying levitating acoustic energy at a frequency slightly less than the center resonant frequency. Oscillations are maintained by applying acoustic energy slightly greater than the center resonant frequency. The restoring force constant of the levitation force is proportional to square of the frequency of oscillation of the object.

22 Claims, 4 Drawing Sheets

FIG. 1
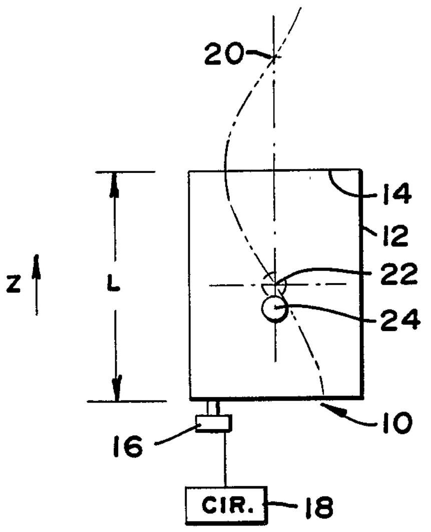
FIG. 3
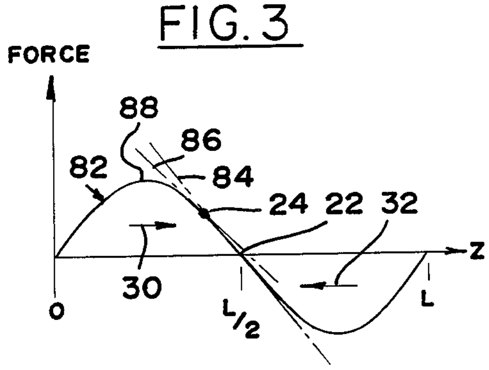
FIG. 8
FIG. 2
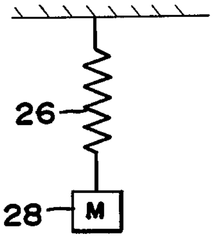
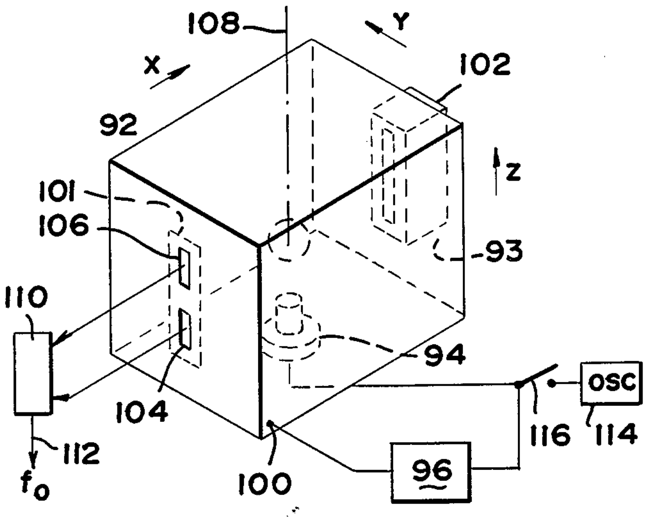
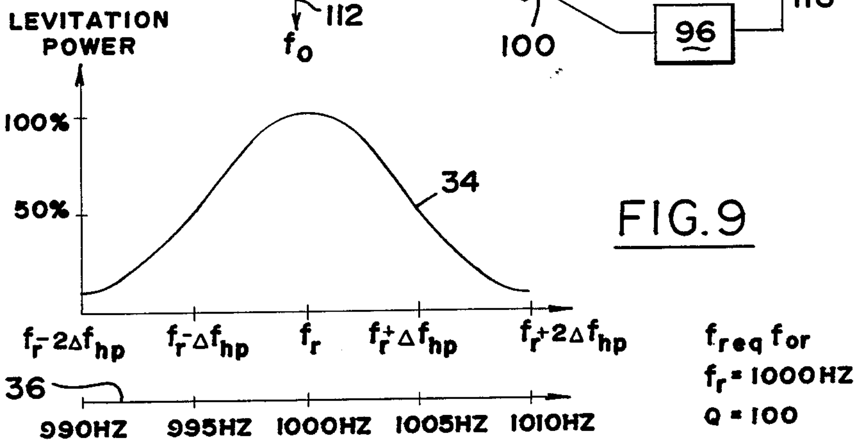
FIG. 9

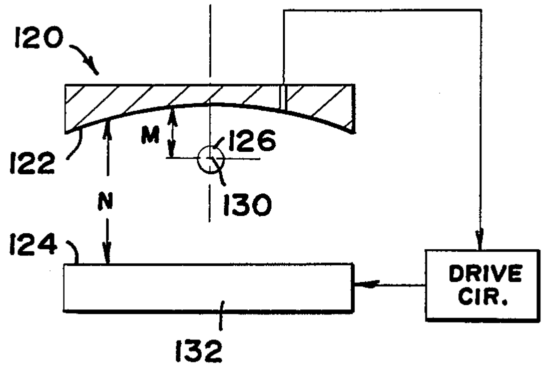
FIG.10
FIG.11
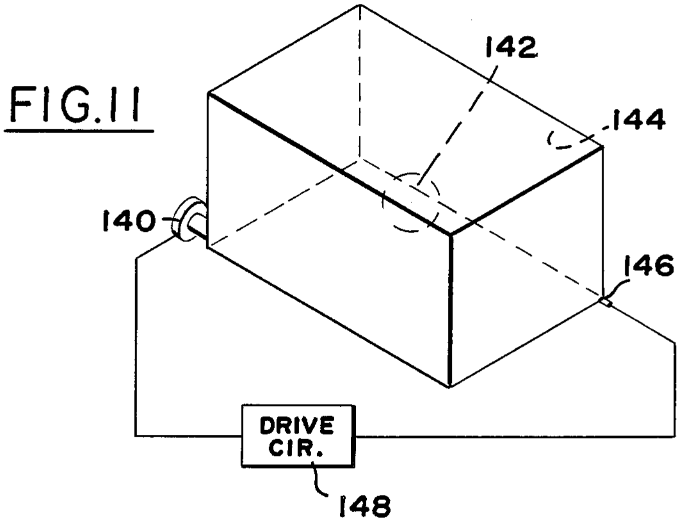
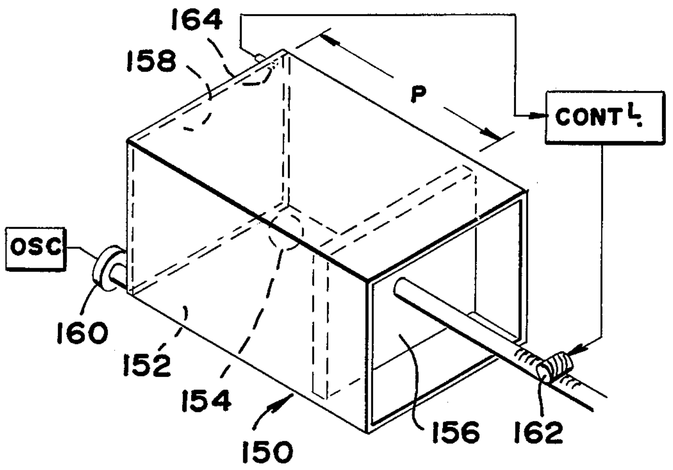
FIG.12

STABILIZATION AND OSCILLATION OF AN ACOUSTICALLY LEVITATED OBJECT

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

In acoustic container processing systems, an object or sample is held within a gas-filled chamber, at a location away from the walls of the chamber by an acoustic standing wave field. It is often desirable to maintain the object at its equilibrium levitation position without substantial oscillations of the object about that position. In the prior art, it was found that when a sample was displaced from its equilibrium position, as when it was initially placed in the acoustic field, the sample would oscillate about its equilibrium position. It would often require tens of minutes for viscous drag from the gas in the chamber to damp the oscillations and cause the sample to lie completely stable. There are also applications where it is desirable to establish and maintain oscillations of the sample about its equilibrium position. A technique which enabled rapid damping of sample oscillations, or which forced the sample to oscillate and maintained the sample in oscillation would be of considerable value.

It is often necessary to determine the force which an acoustic field can exert on an object for a predetermined displacement of the object from an equilibrium position. For example, this enables an operator to determine whether the acoustic energy is of sufficient intensity to prevent the object from reaching the walls of the chamber under a given gravity or microgravity equilivent. While it is possible to place an object at the end of a thin wire or rod and measure the force on the object for a given displacement from an equilibrium position, this technique does not accurately indicate the forces on the object under conditions such as large heating of the object to melt it and the consequent uneven heating of the gas within the chamber, especially if the chamber dimensions are altered to produce movement of the object. A simple method for determining the relative force on the object for a given displacement from its equilibrium position would be of considerable value.

SUMMARY OF THE INVENTION

In accordance with one embodiment of the present invention, techniques are provided for use in systems where an object is acoustically levitated, for controlling object oscillation and for employing such oscillation to sense the relative force or spring rate of force on the object. The object can be stably held, to quickly damp oscillations and resist new oscillations, by applying the levitating acoustic energy at a frequency which is less than the center resonant frequency for the resonant mode which is excited. The object can be maintained in oscillation by establishing the acoustic energy at a frequency above the center resonant frequency of the mode which is excited.

The restoring force constant K which indicates the restoring force per unit displacement of an object from its equilibrium position can be determined by measuring the frequency of oscillation of the object about its equilibrium position. The restoring force constant K is proportional to the square of the frequency of oscillation times the levitated mass. It is often sufficient to determine the relative restoring force constant so as to determine how the levitation force field changes under changing operating conditions.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified sectional view of an acoustic levitation apparatus constructed in accordance with the present invention.

FIG. 2 is a diagrammatic view of a mass supported by a spring, showing a force equivalent of the apparatus of FIG. 1.

FIG. 3 is a graph showing the variation of force with vertical position for the sample in the chamber of FIG. 1.

FIG. 8 is a perspective view of an apparatus useful in determining the restoring force constant produced by an acoustic field on an object.

FIG. 9 is a graph showing the variation in acoustic power that can be produced in a chamber as a function of deviation of the acoustic frequency from the center resonant frequency.

FIG. 10 is a sectional view of a single axis levitator constructed in accordance with another embodiment of the invention.

FIG. 11 is a perspective view of a single mode levitator constructed in accordance with another embodiment of the invention.

FIG. 12 is a perspective view of a variable length levitator constructed in accordance with another embodiment of the invention.

DESCRIPTION OF THE PREFERRED EMBODIMENTS

Figure 4:
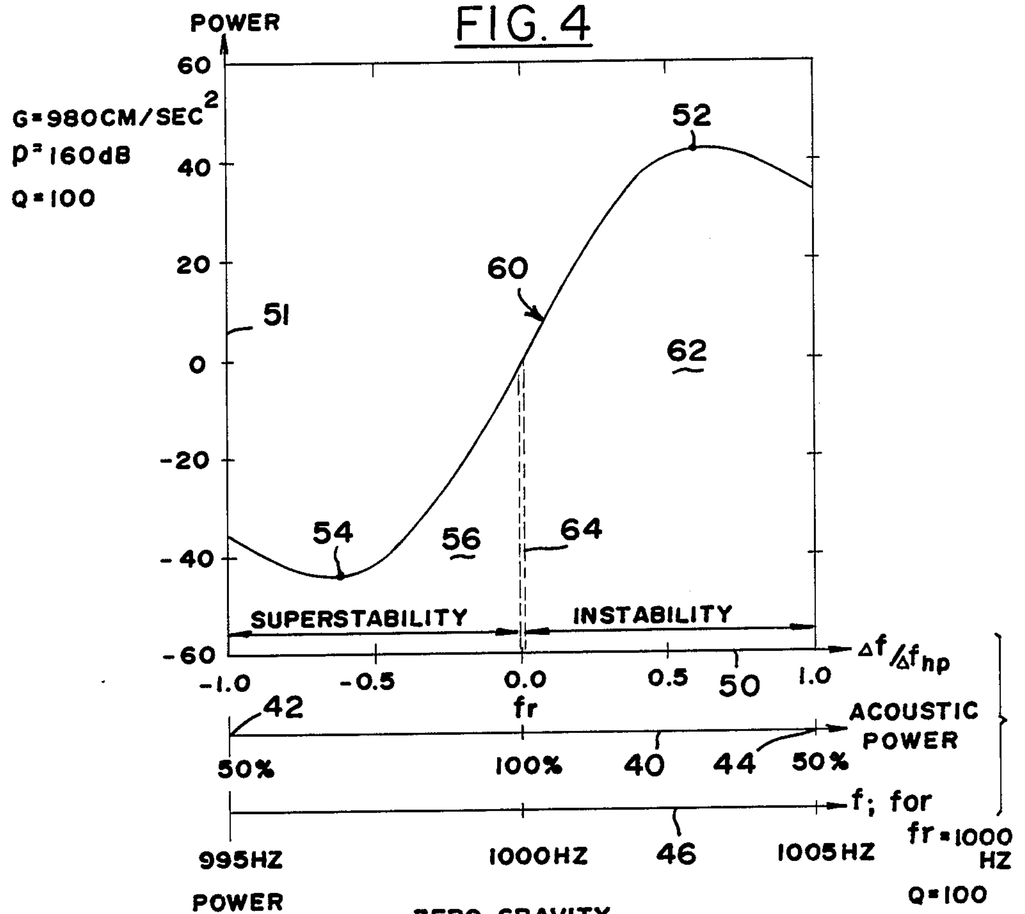
FIG. 4 is a graph showing the relative power either inducing or suppressing sample oscillation, as a function of deviation of acoustic frequency from a center resonant frequency, for the case where the sample is located in an one-G (Earth) gravity environment.

FIG. 1 illustrates an acoustic levitation system 10 which includes walls 12 forming a resonant chamber 14. An acoustic transducer 16 driven by a circuit 18 produces acoustic energy which is resonant to the length or height L of the chamber which extends in the vertical direction Z. In this particular example, the transducer 16 is driven at the lowest plane wave mode that is resonant to the height of the chamber, wherein the transducer produces a standing acoustic pressure wave of a wavelength indicated at 20, which is twice the height of the chamber. This acoustic energy results in a levitation position 22 to which objects in the chamber are urged.

It is assumed in this description that the volume of the levitated object is no more than 20% of the volume of the chamber, so the acoustic energy is minimally scattered by the object. It is expected that the levitation phenomena also apply to larger ratios, although applicant has not yet conducted experiments or analyses for such a range. It should be noted that in this example, additional acoustic standing wave fields are required along the horizontal dimensions of the chamber to prevent the object from moving horizontally.

In a zero gravity environment, the object will tend to assume the levitation position 22, and that will be the object's equilibrium position. In a moderate gravity environment such as exists at the Earth's surface, where the gravity force is one-G which equals 980 cm/sec$^2$, the object will assume an equilibrium position whose center is indicated at 24. At position 24, the force of gravity urging the object downwardly equals the acoustic levitating force urging the object upwardly. The force on the object as a function of its displacement Z from the center position L/2 is indicated in FIG. 3. It can be seen that the force urging the object towards the center position varies sinusoidally, and is in the directions indicated by the arrows 30, 32 to urge the object back towards the levitation position when it deviates therefrom. The acoustic levitation force may be considered the equivalent of the force of a spring 26 on a mass 28, as indicated in FIG. 2. In that case, the spring force urging the object back towards its equilibrium position is opposite to the displacement of the object, and varies proportionately with the displacement of the object, at least for small displacements.

It has heretofore generally been considered desirable to acoustically levitate an object by applying acoustic energy as close to the center resonant frequency as possible, in order to maximize the acoustic force for the particular levitation mode that is chosen. A levitation mode is a frequency resonant to a chamber (which in the extreme may have only two opposing walls), which urges an object toward a position that is spaced from the reflecting chamber walls. The use of the center resonant frequency has been generally sought because, for a particular resonant mode and power level applied to a transducer, the force urging a displaced object towards the levitation position is a maximum when the deviation from the central resonant frequency is a minimum. FIG. 9 includes a curve 34 showing the variation in levitation power with deviation of the applied acoustic frequency from the center acoustic frequency $f_r$. The frequency deviation from $f_r$ at which the power level is one-half maximum is denoted as $\Delta f_{hp}$. The line 36 shows the variation in frequency for the case where $f_r = 1{,}000$ Hz and the resonance quality factor Q is 100. $Q = f_r/2\Delta f_{hp}$. Operation much beyond a half power frequency $f_r \pm \Delta f_{hp}$, such as beyond $f_r \pm 2\,\Delta f_{hp}$, generally results in insufficient levitation force to hold the object in position. For a Q of 100, $f_r \pm 2\Delta f_{hp}$ occurs at 99% of $f_r$ and 101% of $f_r$.

In the prior art, it was often found that the object would oscillate about its equilibrium position; sometimes the oscillations would continue indefinitely, and at other times the oscillations would damp very slowly. No way was known for closely controlling such oscillations. In accordance with one aspect of the present invention, applicant has found that oscillations can be rapidly damped or enhanced by close control of the frequency of the acoustic energy applied to the chamber. FIG. 4 illustrates the variation in oscillation-controlling power, which urges a decrease or increase in oscillation of an acoustically levitated object as a function of the deviation of the frequency of the acoustic energy from the center resonant frequency. The center resonant frequency $f_r$ for a particular resonant mode applied to a resonant chamber is the frequency at which the acoustic pressure is a maximum within the chamber. Frequencies close to the center resonant frequency are considered to be resonant to the chamber in that they produce acoustic pressure much higher than at frequencies not close to a resonant mode.

One horizontal line 40 in the graph of FIG. 4 represents the variation in acoustic power (which is proportional to the square of the pressure) within the chamber. At the center frequency $f_r$ the power is 100% of the maximum attainable for that mode and for a given power input to the acoustic transducer, while at points 42, 44 the power is 50% as great. Another horizontal line 46 represents the frequencies for a resonant chamber whose Q, or resonance factor, is 100 and which has a resonant mode at 1,000 Hz. The Q of about 100 is commonly found in chambers constructed by applicant which were intended to be resonant. The Q may easily vary between 10 when little care is taken, to several hundred or 1,000 (for a carefully constructed spherical chamber), when great care is taken to achieve sharp resonance. For the horizontal line 46, the center resonant frequency $f_r$ is 1,000 Hz, while the half power frequencies are 995 Hz and 1,005 Hz, respectively. Another horizontal line 50 represents the ratio between $\Delta f$ which is the deviation in frequency from the center resonant frequency, and $\Delta f_{hp}$ which represents the deviation from $f_r$ at which the acoustic power is one-half that at $f_r$.

In FIG. 4, the ordinate 51 represents the relative power applied to a leviated object, which urges the object towards or away from its quiescent position at every oscillation of the object. For the graph of FIG. 4, a power above zero represents work being applied to the object urging it to increase its amplitude of oscillation (there is always at least infinitesimal oscillations present), while a power of less than zero represents work withdrawn from the object which reduces its oscillation amplitude. It can be seen that at the center resonant frequency $f_r$, there is no net work done on the object urging or preventing oscillation. The maximum force on the object urging it to oscillate is at point 52 where the frequency of acoustic energy is above $f_r$ by about 0.6 of the deviation $\Delta f_{hp}$ that results in one-half maximum acoustic power. At this frequency, the acoustic power is about 70% of maximum. Maximum damping of the levitated object occurs at the point 54, which is below $f_r$ by about 0.6 of the deviation that results in one-half power, and the levitation power is about 70% of maximum thereat. The frequency at point 54 is about $f_r - f_r/4Q$.

For the horizontal line 46 in FIG. 4, it can be seen that in a typical chamber (Q is about 100) the frequencies that produce the greatest oscillation forces or greatest damping deviate only about 0.3% from the center resonant frequency $f_r$. To produce maximum stability, the resonant frequency is maintained slightly below the center resonant frequency, which may result in a deviation somewhat less than at point 54 in order that the acoustic levitation force be maintained close to the maximum. Similarly, object oscillation is maintained by applying acoustic energy slightly above $f_r$ with the amount dependent upon the height of the desired oscillations and the need to maintain high levitation forces. The area 56 under the curve 60 may be referred to the "superstability" region, while the area 62 under the curve may be referred to the region of "instability."

It may be noted that there is a small moderate-stability region 64 under the graph, which extends from $f_r$ to slightly above that, where the levitated object is stable but not super stable. In this frequency range, a levitated object which is disturbed will decay under the effects of viscosity or drag of the gas in the chamber, even though there is a small amount of work done on the object urging continued oscillation but with that work being less than that necessary to overcome the drag. It should be noted that the conditions of FIG. 4 exist only in an environment of substantial gravity such as that which exists at the Earth's surface.

Figure 5:
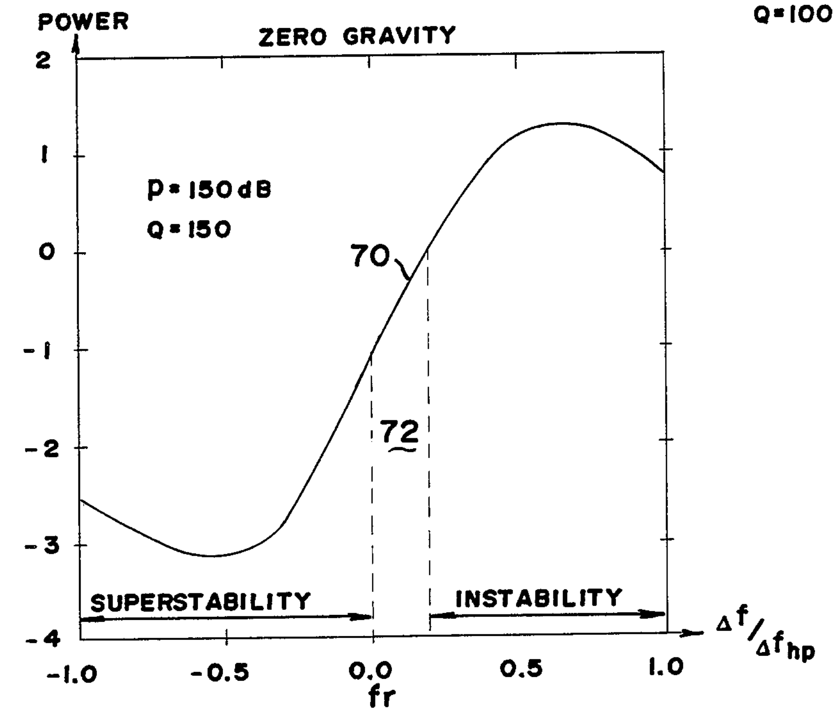
FIG. 5 is a graph similar to that of FIG. 4, but for the case where the sample is located in a zero gravity environment.

FIG. 5 is a graph which includes a curve 70 similar to the curve 60 of FIG. 4, except that the curve 70 represents the stabilizing and unstabilizing power applied to a levitated object in a zero gravity environment. The graph of FIG. 5 is similar to that of FIG. 4 except that it includes a much wider region 72 of moderate stability. Thus, to maintain oscillations of an object in a zero gravity environment, the frequency of the acoustic energy must be greater than the center resonant frequency $f_r$ by an amount equal to about 20% of the frequency deviation at which the acoustic power is one-half that at $f_r$.

Figure 6:
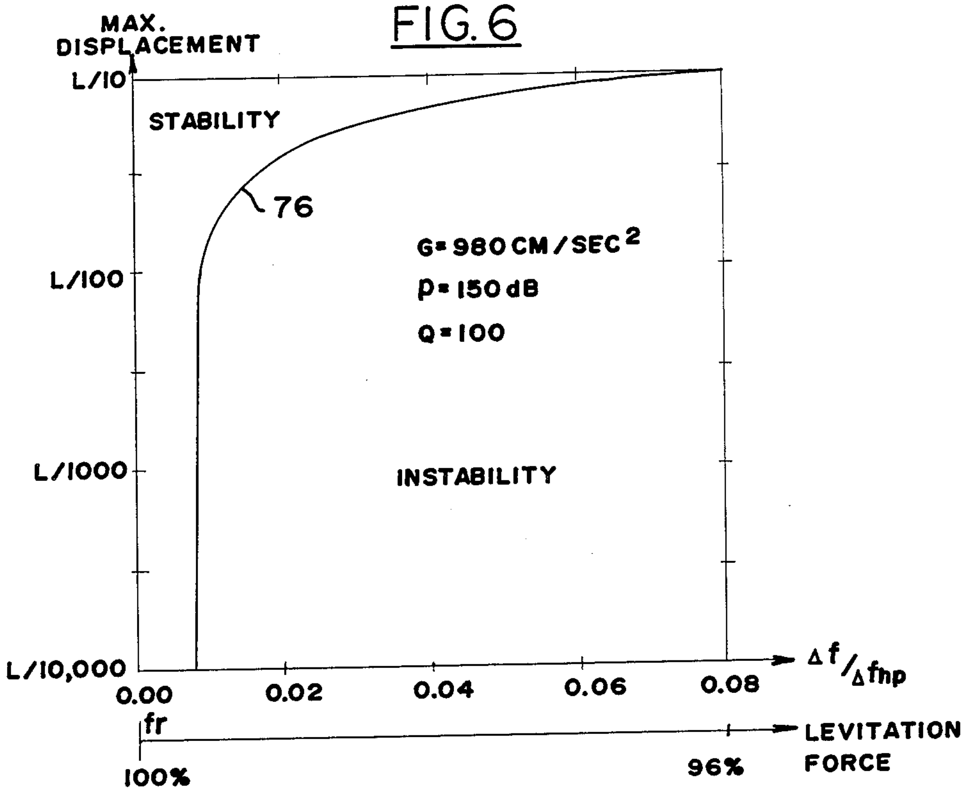
FIG. 6 is a graph showing the displacement of a sample from its equilibrium position, as a function of the deviation of acoustic frequency from the center resonant frequency, which results in stability or instability of a sample in a one-G gravity environment.

FIG. 6 includes a curve 76 which shows the amplitude of oscillation attained by an object in a one-G environment (equivalent acceleration of 980 cm/sec$^2$), when the acoustic levitating energy is at various frequencies above the center resonant frequency. Oscillations begin only when $\Delta f/\Delta f_{hp}$ is at least 0.008, at which the acoustic power is about 99% of that which exists at $f_r$. At any frequency above this onset frequency, the object will begin oscillating, with the oscillations increasing until they reach a constant amplitude. Thus, at $\Delta f/\Delta f_{hp}=0.07$, the object will begin oscillating until it reaches a maximum oscillation of L/10 or in other words, about 10% of the height of the chamber.

Figure 7:
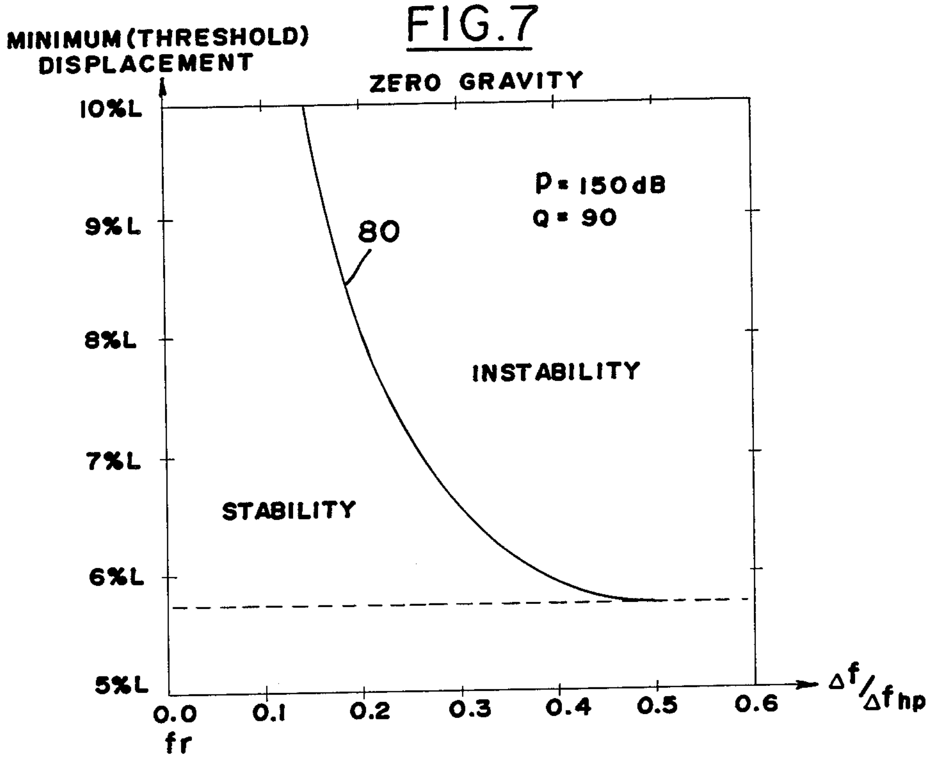
FIG. 7 is a graph similar to that of FIG. 6, but for the case where the sample is in a zero gravity environment.

FIG. 7 includes a curve 80 for a zero gravity environment, indicating the amount of displacement, or threshold displacement, of an object from its quiescent position required before oscillations continue and grow, at different frequencies above the center resonant frequency $f_r$. The maximum amplitude of the oscillations are limited by second order effects.

Applicant has found that knowledge about the frequency of oscillation of an object in an acoustic field provides an indication of the force that the field can apply to the object to levitate it. As indicated by the curve 82 in FIG. 3, the acoustic force on an object is zero at the levitation position, and increases sinusoidally with deviation from its levitation position 22. For small deflections from the levitation position 22, the sinewave 82 is substantially linear, with a slope indicated by line 84. The slope of line 84 may be referred to as the restoring force constant K. The actual force urging a deviating object back towards the levitation position is equal to Kz, where z is the deviation from the levitation position. The frequency of oscillation $f_0$ of an object about its equilibrium position is given by:

$$f_0 = \frac{1}{2\pi}\sqrt{K/M} \quad \text{Eq. 1}$$

where K is the restoring force constant and M is the mass of the levitated object. For small oscillations of the object about its equilibrium position, K is substantially constant. Since the mass of the object is easily determined, and $f_0$ can be easily determined as by direct observation of the oscillating mass, it is a relatively simple matter to determine K. The restoring force constant K represents the strength of the force that will return a deviating object back towards its equilibrium position, and knowledge as to K is of great importance. A major consideration in designing and operating an acoustic levitation system is to assure that K at the equilibrium position of the object, will be sufficient to assure that the object will be reliably maintained in position. Prior art techniques involved placing an object at the end of a thin wire or rod in an acoustic field and measuring the acoustic force on the object as it was displaced from an equilibrium position. In applications where the object is to be heated to a molten temperature, it is difficult to measure the available levitation force. By merely measuring the frequency of oscillation of the object under any particular conditions, it is possible to readily and accurately determine the restoring force constant K.

Knowledge as to K, which is the slope of the sinusoidal force curve at the equilibrium position, enables a precise prediction of the maximum levitation force available. In an environment of significant gravity, the object is not maintained at the acoustic levitation position such as 22 in FIG. 1, but is displaced from that position to an equilibrium position 24, at which the weight of the object equals the acoustic force levitating the object. In FIG. 3, point 24 represents the equilibrium position of the object, showing its position along the sinusoidal force curve 82. It can be seen that at the position 24, the slope of the curve is indicated by line 86. The slope of line 86 is equal to the restoring force constant K at the position 24. By measuring the frequency of small oscillations of a levitated object in a gravity environment about its equilibrium position, it is possible to determine K at that particular position.

FIG. 8 illustrates an apparatus 90 for levitating an object 92 within a resonant chamber 93 by the use of acoustic energy generated by a transducer 94 such as a piezoelectric type which is electrically energizable over a range of frequencies by a circuit 96. A microphone 100 lies in the chamber at a location of high acoustic pressure, and delivers its output to the circuit 96. For maximum levitation force in the Z direction, the circuit 96 is controlled to energize the transducer 94 at a frequency which is at the center resonant frequency $f_r$ for the applied levitation mode. By slightly increasing and decreasing the frequency and noting whether the output of the microphone increases or decreases, the circuit 96 can maintain a frequency very close to the resonant frequency despite changes in the center resonant frequency, such as due to heating of the chamber as when the object is to be heated. It is noted that the object can be prevented from wandering in X and Y directions by also driving the transducer 94 at frequencies resonant to these dimensions, or by driving the transducer at a single frequency levitation mode. The object can be maintained stable against oscillations by reducing the frequency slightly below $f_r$. The resonance factor Q of the chamber is approximately known (or can be determined by measuring change in pressure for a given frequency deviation from $f_r$), and the amount by which the frequency can be reduced without greatly reducing the levitation force can be readily determined.

In order to determined the restoring force constant K, the object 92 is briefly oscillated about its equilibrium position and the frequency of oscillations is noted. The frequency of oscillations can be determined merely by a person measuring them with a stop watch, which is enabled by constructing the chamber walls transparent or with a transparent window indicated at 101. Alternatively, a light source 102 directs light across the object 92 onto a pair of photodetectors 104, 106. As the object 102 oscillates along the axis 108, the difference in outputs of the photodetector varies at the same frequency. A difference circuit 110 has an output 112 which carries an electrical signal which varies at the frequency of oscillation of the object along the Z direction. Although the restoring force constant K can be calculated by knowledge as to the mass of the object and its frequency of oscillation, it is often sufficient only to determine the relative restoring force constant, which is proportional to the square of the frequency of $f_0$.

In an environment of one-G gravity, oscillation of the object can be initiated by increasing the frequency of the acoustic energy applied by the transducer 94 to be above the central resonant frequency $f_r$. Once significant oscillation is observed, the frequency can be reduced to below $f_r$ to quickly damp out oscillations. In a zero gravity environment, an initial displacement of the object is necessary to begin oscillations. One way to establish such a displacement is to stop applying the acoustic energy which levitates the object and to begin applying it again only after the object has drifted away from its equilibrium position. A faster way to begin object oscillation in a zero gravity environment is to modulate the acoustic energy field which levitates the object, with a frequency about equal to the natural frequency of oscillation of the object about its equilibrium position. Care should be taken not to exceed the displacement threshold at which oscillation grows (e.g., in FIG. 7 where the minimum displacement exceeds 5.7% of the length of the chamber), or else oscillations can grow excessively large. Where the mass and restoring force constant K are known approximately, applying a frequency fairly close to $f_0$ will begin oscillation of the object. In FIG. 8, a low-frequency oscillator 114 is shown, which can be coupled through a switch 116 to transducer 94 to modulate the higher frequency levitation acoustic energy by the lower frequency which is about the same as $f_0$. Once significant oscillations occur and their frequency is measured, the switch 116 can be opened.

The above techniques for stabilizing and oscillating an acoustically levitated object, and for determining the relative levitation force on the object applies to a variety of acoustic levitation systems. One such type of system, shown in FIG. 10, is a single-axis levitator 120 which includes a pair of facing surfaces 122, 124 lying on axis 125, with one of them such as 124 being vibrated towards and away from the other, and the other 122 being curved. An object 126 can be levitated near a levitation location 130 spaced a distance M from the curved surface equal to a quarter wavelength of the acoustic pressure. A higher Q is obtained by using a separation distance N equal to an odd multiple of a half wavelength of the acoustic energy, so that the acoustic frequency is resonant to the levitator. By selecting a frequency slightly less than such a resonant frequency, the object is held stably against oscillations, as described above. By using a frequency slightly higher than the resonant frequency, the object can be made to oscillate as described above. It may be noted the Q of a resonant single-axis levitator may be about 30, so the required deviation for the resonant frequency for a given effect will be larger than for a Q of 100. A measure of the object's oscillation frequency indicates the relative levitation force.

Another type of levitator, illustrated in FIG. 11, is a single transducer or single mode levitator, as is described in U.S. Pat. No. 4,573,356. In such a levitator, a single frequency from a transducer 140 levitates an object 142 within a chamber 144. A sensor 146 such as a microphone can be coupled to a drive circuit 148 to maintain the frequency near resonance. By establishing the frequency slightly below resonance, oscillations of the object are rapidly damped, while maintaining the frequency slightly above resonance can result in producing oscillation. The microphone 146 senses the acoustic pressure, and the drive circuit 148 is constructed to maintain a frequency at which the acoustic pressure is a predetermined percentage of maximum to maintain at least about half the maximum levitation force. When the object oscillates in more than one direction, the preferred direction of oscillation of the object is the direction of oscillation in which the oscillation frequency is maximum (that is, the direction of greatest restoring force constant K). Where it is desired to oscillate the object in any arbitrary direction, this can be accomplished by modulating the frequency applied to the transducer 140 by a frequency $f_0$ equal to the frequency of oscillation of the object in that direction. To determine $f_0$ for a particular direction, the modulating frequency $f_0$ can be swept through a range of frequencies, and the direction of oscillation of the object at particular frequencies $f_0$ can be observed. The frequency of oscillation in each direction also indicates the restoring force constant K in that direction.

FIG. 12 illustrates a system 150 wherein the dimension of a chamber 152 in which an object 154 is levitated can be altered by moving one of the walls 156 of the chamber towards and away from the opposite wall 158. A substantially fixed frequency transducer 160 excites the chamber. The moveable wall 156 can be moved to change the chamber dimension so that the transducer frequency is resonant to the chamber. A motor 162 is shown which can move the moveable chamber wall. A pressure transducer 164 senses the amplitude of the acoustic energy. A controller can control the motor to mainain the chamber length so it is resonant to the acoustic energy. To maintain the object stable, the controller maintains the length of the chamber slightly less than the length P at which the chamber is resonant to the frequency of oscillations of the oscillator 160. This can be accomplished by maintaining a chamber length at which the acoustic pressure sensed by transducer 164 is a predetermined percentage of that attainable at a chamber length D. To produce oscillations of the object, the length of the chamber is made slightly longer than the length P at which the chamber is resonant to the acoustic frequency. The restoring force constant K can be determined as in the earlier described embodiments of the invention, by observing the frequency of oscillation of the object and noting its mass.

Thus, the invention provides systems for use with an acoustically levitated object to control oscillations of the object and which also enables object oscillation to be used to determine the relative acoustic force that can be applied to an object. The application of acoustic energy slightly below a center resonant frequency of the object results in rapid damping of any oscillations of the object, to provide high stability in object position. The application of acoustic energy above the central resonant frequency can result in enhancing oscillation of the object, with object oscillation automatically occuring in a one-G gravity environment and occuring in a zero gravity environment only upon at least minimal displacement or oscillation of the object. The restoring force constant K can be determined by measuring the frequency of oscillation of the object and by knowledge of its mass, and changes in K or relative values of K can be determined solely by measuring the frequency of oscillations of the object.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for damping oscillation of an object which is levitated in a resonant chamber by acoustic energy of a frequency which is approximately resonant to the chamber comprising:

applying acoustic energy to said chamber at a frequency which is less than the center resonant frequency $f_r$ of the chamber but which is greater than $f_r - 2\Delta f_{hp}$ where $\Delta f_{hp}$ is the frequency deviation from $f_r$ at which the levitation power on the object is one-half that at $f_r$.

2. The method described in claim 1 wherein:

said chamber has a Q on the order of magnitude of 100 and said step of applying acoustic energy includes applying acoustic energy of a frequency between $f_r$ and 99% of $f_r$ until oscillations of the object are substantially eliminated.

3. The method described in claim 1 wherein:

said step of applying acoustic energy includes applying acoustic energy of a frequency of about $f_r - f_r/4Q$, where Q is the resonance factor of said chamber.

4. The method described in claim 1 wherein:

said chamber is controllably expandable and contractable to control the size of the chamber;

said step of applying acoustic energy includes applying acoustic energy at a predetermined frequency; and including controlling the size of said chamber so its size is slightly smaller than the size at which said predetermined frequency is resonant to said chamber.

5. The method described in claim 1 wherein:

said step of applying acoustic energy includes applying a predetermined frequency;

said chamber has a length which is controllably expandable and contractable; and including controlling the length of said chamber so its length is less than the length at which said predetermined frequency equals the center resonant frequency $f_r$ of said chamber but is long enough that said predetermined frequency is greater than $f_r - 2\Delta f_{hp}$ for that chamber length.

6. A method for oscillating an object which is levitated in a resonant chamber by sound energy of a frequency which is approximately resonant to the chamber comprising:

applying acoustic energy to said chamber at a frequency which is greater than a predetermined center resonant frequency $f_r$ of the chamber but which is less than $f_r + 2\Delta f_{hp}$ where $\Delta f_{hp}$ is the frequency deviation from $f_r$ at which the levitation power applied to the object is one-half that at $f_r$.

7. The method described in claim 6 wherein:

said chamber has a Q on the order of magnitude of 100 and said step of applying acoustic energy includes applying acoustic energy of a frequency between $f_r$ and 101% of $f_r$.

8. The method described in claim 6 wherein:

said step of applying acoustic energy includes applying acoustic energy of a frequency of about $f_r + f_r/4Q$, where Q is the resonance factor of the chamber.

9. The method described in claim 6 wherein:

said chamber lies in a substantially zero gravity environment; and including displacing said object from an equilibrium position at which it lies, by an initial displacement which is above the threshold displacement at which oscillations grow when said frequency which is greater than said center resonant frequency continues to be applied to said chamber.

10. The method described in claim 9 wherein:

said step of displacing comprises modulating said acoustic energy by a frequency about equal to the natural frequency $f_0$ of oscillation of said object in the acoustic field created by said acoustic energy.

11. The method described in claim 9 wherein:

said step of displacing comprises ceasing to apply acoustic energy to said chamber which holds said object in position, and allowing said object to drift.

12. The method described in claim 6 wherein:

said chamber is controllably expandable and contractable to control the size of the chamber;

said step of applying acoustic energy includes applying acoustic energy at a predetermined frequency; and including controlling the size of said chamber so its size is slightly greater than the size at which said predetermined frequency is resonant to said chamber.

13. The method described in claim 6 wherein:

said step of applying acoustic energy includes applying a predetermined frequency;

said chamber has a length which is controllably expandable and contractable; and including controlling the length of said chamber so its length is greater than the length at which said predetermined frequency equals the center resonant frequency $f_r$ of said chamber but is long enough that said predetermined frequency is less than $f_r + 2\Delta f_{hp}$ for that chamber length.

14. Apparatus for levitating an object within a chamber which has walls, while minimizing object oscillations, comprising:

first means for applying acoustic energy to said chamber while said object lies within said chamber, where said acoustic energy is resonant to said chamber and is of a mode that urges said object toward a levitation position away from the chamber walls, said applying means being controllable to vary the frequency of said acoustic energy;

second means coupled to said first means, for controlling the frequency of said acoustic energy to maintain it below the center resonant frequency of said mode but at a frequency high enough that the levitation force on said object is at least about half the levitation force which is applied when said acoustic energy is at said center resonant frequency.

15. The apparatus described in claim 14 wherein:

said chamber has a Q on the order of magnitude of 100 and said second means is constructed to control said first means to apply acoustic energy of a frequency between the resonant frequency $f_r$ of said mode and 99% of said resonant frequency.

16. The apparatus described in claim 14 wherein:

said second means is constructed to control said first means to apply said acoustic energy of a frequency of about $f_r - f_r/4Q$, where Q is the resonance factor of said chamber and $f_r$ is the center resonant frequency of said mode.

17. Apparatus for levitating an object within a chamber which has at least one wall which is moveable to change the chamber length, while minimizing object oscillations, comprising:

means for applying acoustic energy to said chamber of a first frequency while said object lies in said chamber;

means responsive to the intensity of acoustic energy in said chamber for moving said moveable chamber wall to establish a chamber length which is slightly less than a length at which said first frequency equals a center resonant frequency of said chamber.

18. Apparatus for levitating an object within a chamber which has walls, and for maintaining the object in oscillation while it is levitated, comprising:

first means for applying acoustic energy to said chamber while said object lies within said chamber, of a frequency which is resonant to said chamber and which is of a mode that urges said object toward a levitation position away from the chamber walls, said first means being controllable to vary the frequency of said acoustic energy;

second means coupled to said first means, for controlling the frequency of said acoustic energy to maintain it above the center resonant frequency of said mode, but at a frequency low enough that the levitation force on said object is at least about half the levitation force which is applied when said acoustic energy is at said center resonant frequency.

19. The apparatus described in claim 18 wherein:

said chamber has a Q on the order of magnitude of 100 and said second means controls said first means to apply said acoustic energy at a frequency of between $f_r$ and 101% of $f_r$, where $f_r$ is the center resonant frequency of said mode.

20. The apparatus described in claim 18 wherein:

said second means is constructed to control said first means to apply said acoustic energy of a frequency of about $f_r + f_r/4Q$, where Q is the resonance factor of said chamber and $f_r$ is the center resonant frequency of said mode.

21. The apparatus described in claim 18, including:

means for modulating said acoustic energy by a frequency about equal to the natural frequency of oscillation of said object in the presence of said acoustic energy in said chamber.

22. Apparatus for levitating an object within a chamber which has at least one wall which is moveable to change the chamber length and for maintaining the object in oscillation, comprising:

means for applying acoustic energy to said chamber of a first frequency while said object lies in said chamber;

means responsive to the intensity of acoustic energy in said chamber for moving said moveable chamber wall to establish a chamber length which is slightly greater than a length at which said first frequency equals a center resonant frequency of said chamber.

* * * * *